United States Patent
Charan et al.

(10) Patent No.: US 11,740,360 B2
(45) Date of Patent: Aug. 29, 2023

(54) LIGHT DETECTION AND RANGING (LIDAR) SCAN SMOOTHING

(71) Applicant: Motional AD LLC, Boston, MA (US)

(72) Inventors: Ajay Charan, Oakmont, PA (US); Yimu Wang, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 373 days.

(21) Appl. No.: 17/087,579

(22) Filed: Nov. 2, 2020

(65) Prior Publication Data

US 2022/0137219 A1  May 5, 2022

(51) Int. Cl.
*G01S 17/89* (2020.01)
*G01S 17/931* (2020.01)

(52) U.S. Cl.
CPC ............ *G01S 17/89* (2013.01); *G01S 17/931* (2020.01)

(58) Field of Classification Search
CPC ...... G01S 17/89; G01S 17/931; G01S 7/4808; G01S 7/4802; G01S 7/48; G01S 17/86; G01S 17/894; G01S 7/4817; B60W 60/00; B60W 40/02; B60W 2420/52; G06T 5/00; G06T 5/002
See application file for complete search history.

(56) References Cited

U.S. PATENT DOCUMENTS

| | | |
|---|---|---|
| 2013/0121654 A1 | 5/2013 | Lichtenwalner |
| 2018/0276483 A1* | 9/2018 | Zeng ................... G06V 20/588 |
| 2019/0178989 A1* | 6/2019 | Tsai ..................... G01S 17/42 |
| 2020/0217666 A1 | 7/2020 | Zhang et al. |

FOREIGN PATENT DOCUMENTS

| | | |
|---|---|---|
| KR | 2013-0068224 | 6/2013 |
| WO | WO 2020/000137 | 1/2020 |

OTHER PUBLICATIONS

Zhang et al., "LOAM: Lidar Odometry and Mapping in Real-time," Robotics: Science and Systems, Jul. 12, 2014, 2(9), 9 pages.

* cited by examiner

*Primary Examiner* — Jonathan M Hansen
(74) *Attorney, Agent, or Firm* — Fish & Richardson P.C.

(57) ABSTRACT

Among other things, techniques are described for identifying, in a light detection and ranging (LiDAR) scan line, a first LiDAR data point and a plurality of LiDAR data points within a vicinity of the first LiDAR data point. The techniques may further include identifying, based on a comparison of the first LiDAR data point to at least one LiDAR data point of the plurality of LiDAR return points, a coefficient of the first LiDAR data point, wherein the coefficient is related to image smoothness. The techniques may further include identifying, based on a comparison of the coefficient to a threshold, whether to include the first LiDAR data point in an updated LiDAR scan line, and then identifying, based on the updated LiDAR scan line, a location of the autonomous vehicle.

20 Claims, 12 Drawing Sheets

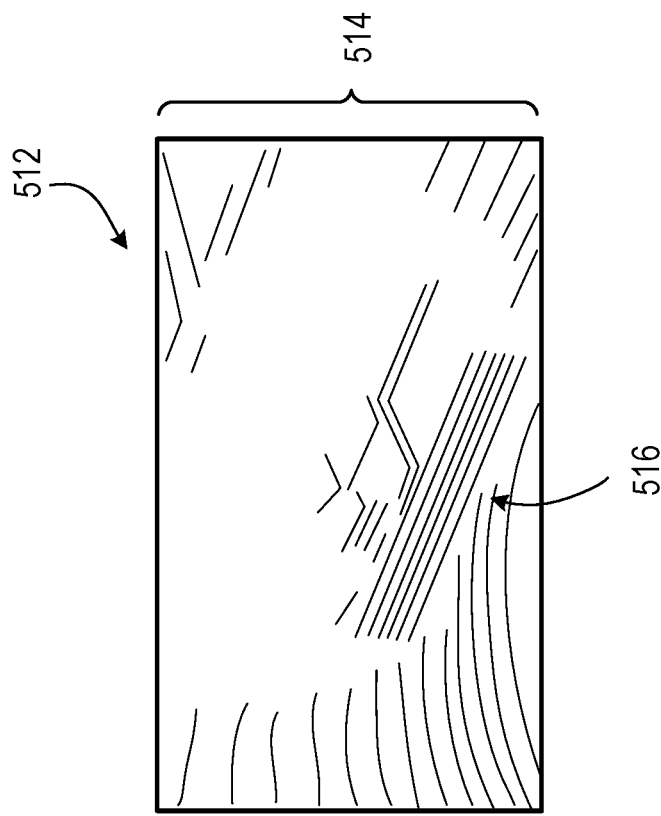
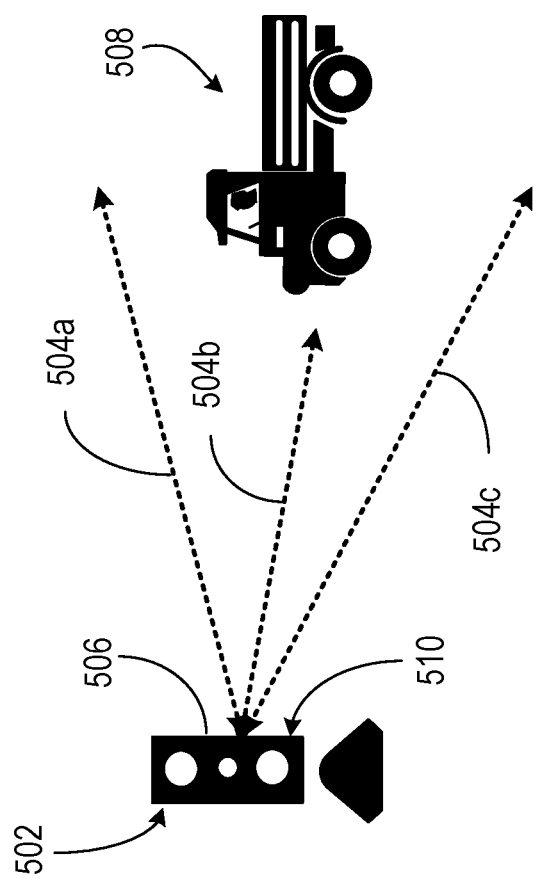
FIG. 5

LIGHT DETECTION AND RANGING (LIDAR) SCAN SMOOTHING

FIELD OF THE INVENTION

This description relates to light detection and ranging (LiDAR) scan smoothing.

BACKGROUND

Typically, a vehicle such as an autonomous vehicle may use a localization procedure to identify where the vehicle is geographically. Specifically, the vehicle may obtain a depth image by, for example, performing a LiDAR scan. The LiDAR scan may then be compared against data related to known geographic locations to identify the location at which the vehicle is located.

BRIEF DESCRIPTION OF THE DRAWINGS

FIG. 5 shows an example of a LiDAR system.

DETAILED DESCRIPTION

Figure 1:
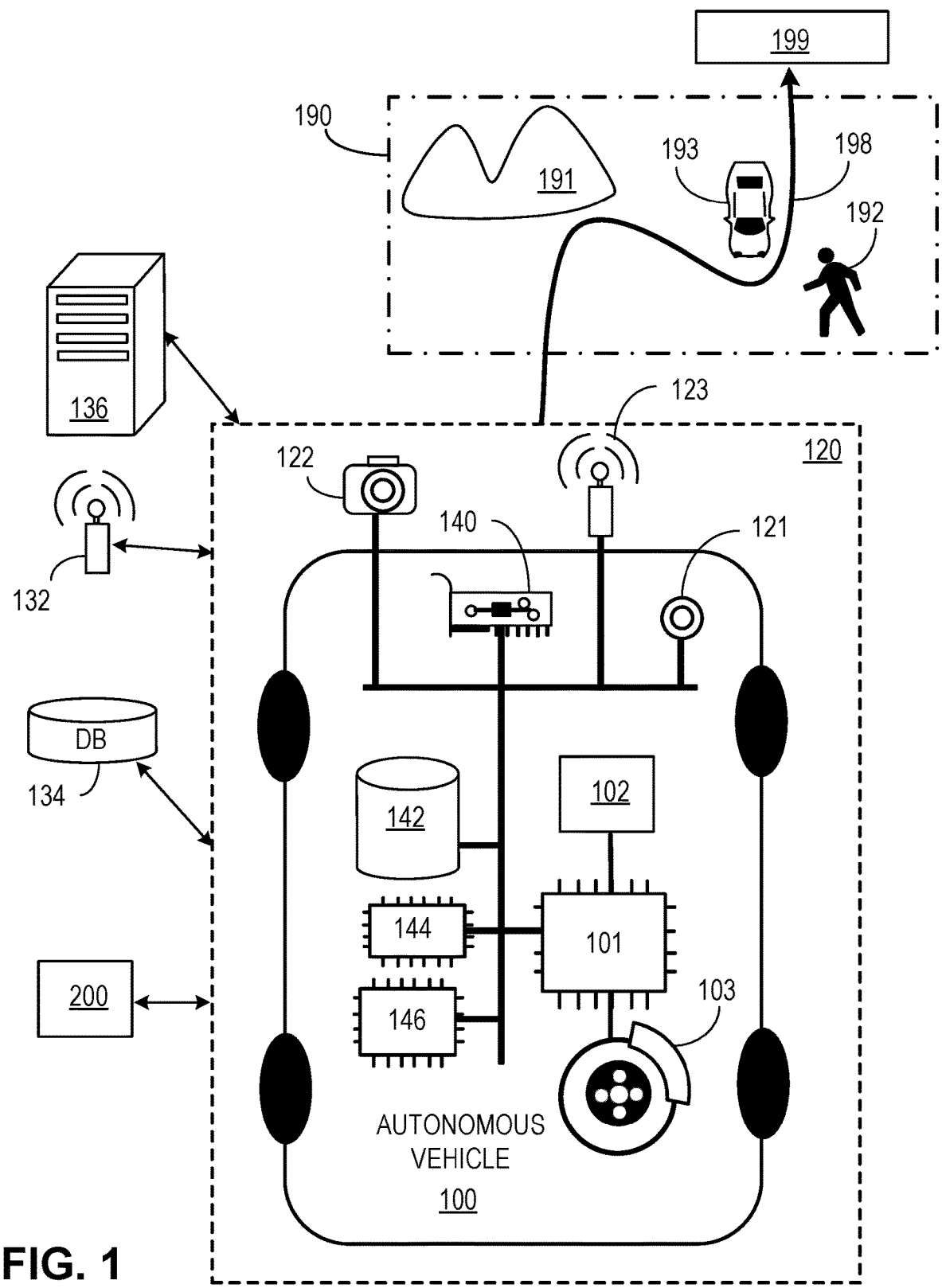
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Scan Line Overview
6. Smoothness Coefficient Examples
7. Use of the Smoothness Coefficient

General Overview

In order to smooth a LiDAR scan, a data point (which may also be referred to as a "return" or a "point") in a LiDAR scan line is identified, and a smoothness coefficient is calculated for that data point based on neighboring data points in the scan line. Based on the smoothness coefficient, the data point is discarded from the LiDAR scan line (if, e.g., the smoothness coefficient equals or exceeds a threshold), or the data point remains in the LiDAR scan line (if, e.g., the smoothness coefficient equals or is below the threshold).

Embodiments herein provide a number of advantages, particularly when implemented as a part of a localization process performed by a vehicle. Specifically, in some embodiments, determining the existence of a relatively high smoothness coefficient associated with a data point can indicate the presence of a transient element in an environment such as a person, a bicycle, foliage, etc., that is associated with that data point. These transient elements are likely to change often (e.g., a person may walk away, a bicycle may ride away, foliage may change, etc.), and, as a result, it can be difficult for a vehicle to accurately perform the localization process based on the presence of these elements. Through detection and removal of data points associated with these elements, less transient structures such a buildings, walls, etc. can be more accurately identified. The use of these less transient structures can also increases the accuracy and repeatability of the localization process for the vehicle, thereby improving the overall efficiency of the vehicle. Additionally, or alternatively, comparisons between at least one LiDAR data point data point included in a LiDAR scan obtained by the vehicle and at least one LiDAR data point included in an earlier-generated LiDAR scan associated with a certain area can be reduced by discounting (e.g., removing) the at least one LiDAR data point included in a LiDAR scan obtained by the vehicle that is associated with (e.g., corresponds to) the transient elements.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 204 described below in reference to FIG. 2. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 208 or storage device 210 described below in relation to FIG. 2. In an embodiment, memory 144 is similar to the main memory 206 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, peripherals 132 are similar to the display 212, input device 214, and cursor controller 216 discussed below in reference to FIG. 2. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
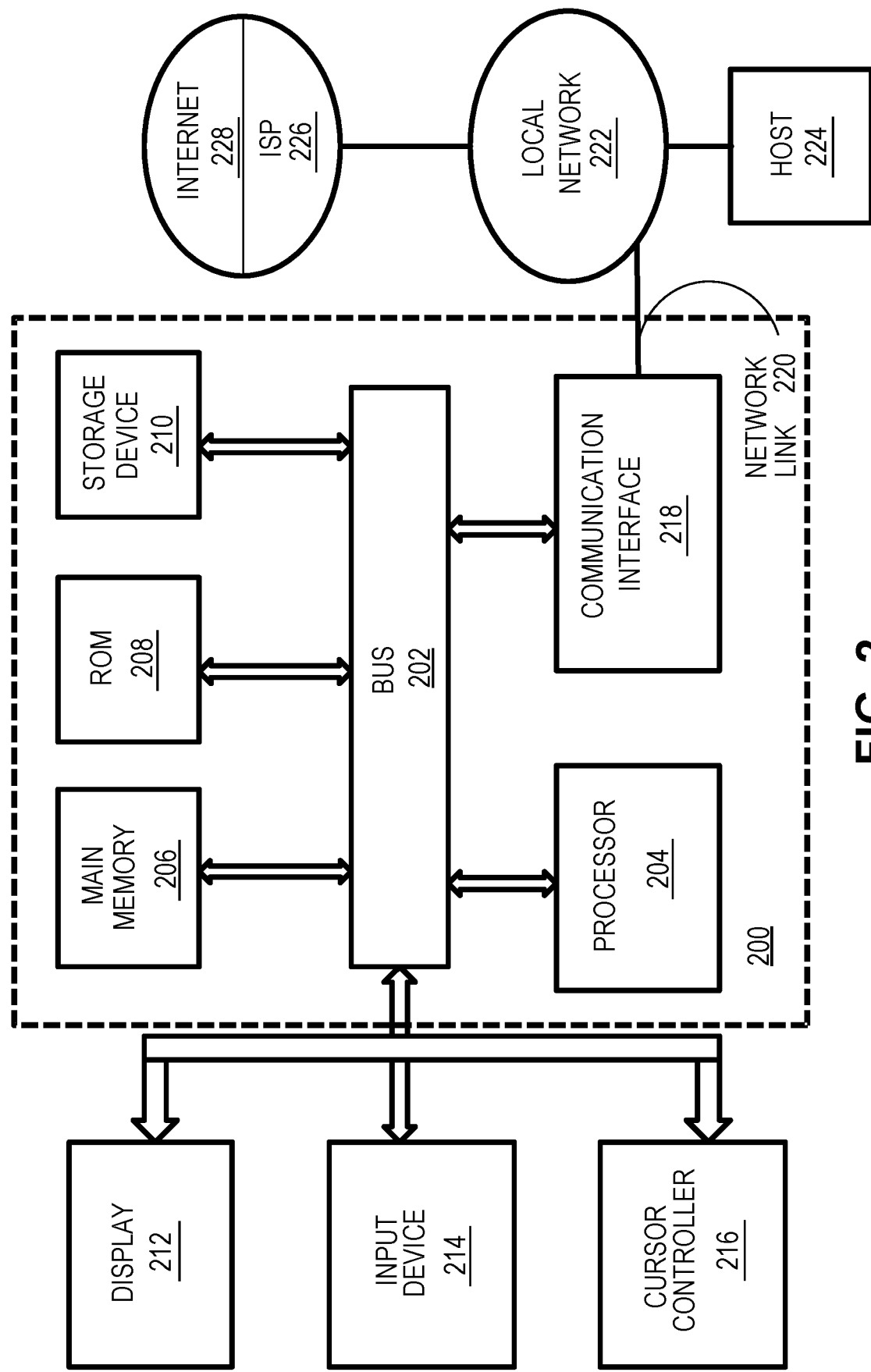
FIG. 2 shows a computer system.

FIG. 2 shows a computer system 200. In an implementation, the computer system 200 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 200 includes a bus 202 or other communication mechanism for communicating information, and a processor 204 coupled with a bus 202 for processing information. The processor 204 is, for example, a general-purpose microprocessor. The computer system 200 also includes a main memory 206, such as a random-access memory (RAM) or other dynamic storage device, coupled to the bus 202 for storing information and instructions to be executed by processor 204. In one implementation, the main memory 206 is used for storing temporary variables or other intermediate information during execution of instructions to be executed by the processor 204. Such instructions, when stored in non-transitory storage media accessible to the processor 204, render the computer system 200 into a special-purpose machine that is customized to perform the operations specified in the instructions.

In an embodiment, the computer system 200 further includes a read only memory (ROM) 208 or other static storage device coupled to the bus 202 for storing static information and instructions for the processor 204. A storage device 210, such as a magnetic disk, optical disk, solid-state drive, or three-dimensional cross point memory is provided and coupled to the bus 202 for storing information and instructions.

In an embodiment, the computer system 200 is coupled via the bus 202 to a display 212, such as a cathode ray tube (CRT), a liquid crystal display (LCD), plasma display, light emitting diode (LED) display, or an organic light emitting diode (OLED) display for displaying information to a computer user. An input device 214, including alphanumeric and other keys, is coupled to bus 202 for communicating information and command selections to the processor 204. Another type of user input device is a cursor controller 216, such as a mouse, a trackball, a touch-enabled display, or cursor direction keys for communicating direction information and command selections to the processor 204 and for controlling cursor movement on the display 212. This input device typically has two degrees of freedom in two axes, a first axis (e.g., x-axis) and a second axis (e.g., y-axis), that allows the device to specify positions in a plane.

According to one embodiment, the techniques herein are performed by the computer system 200 in response to the processor 204 executing one or more sequences of one or more instructions contained in the main memory 206. Such instructions are read into the main memory 206 from another storage medium, such as the storage device 210. Execution of the sequences of instructions contained in the main memory 206 causes the processor 204 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 210. Volatile media includes dynamic memory, such as the main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 202. Transmission media can also take the form of acoustic or light waves, such as those generated during radio-wave and infrared data communications.

In an embodiment, various forms of media are involved in carrying one or more sequences of one or more instructions to the processor 204 for execution. For example, the instructions are initially carried on a magnetic disk or solid-state drive of a remote computer. The remote computer loads the instructions into its dynamic memory and send the instructions over a telephone line using a modem. A modem local to the computer system 200 receives the data on the telephone line and use an infrared transmitter to convert the data to an infrared signal. An infrared detector receives the data carried in the infrared signal and appropriate circuitry places the data on the bus 202. The bus 202 carries the data to the main memory 206, from which processor 204 retrieves and executes the instructions. The instructions received by the main memory 206 can optionally be stored on the storage device 210 either before or after execution by processor 204.

The computer system 200 also includes a communication interface 218 coupled to the bus 202. The communication interface 218 provides a two-way data communication coupling to a network link 220 that is connected to a local network 222. For example, the communication interface 218 is an integrated service digital network (ISDN) card, cable modem, satellite modem, or a modem to provide a data communication connection to a corresponding type of telephone line. As another example, the communication interface 218 is a local area network (LAN) card to provide a data communication connection to a compatible LAN. In some implementations, wireless links are also implemented. In any such implementation, the communication interface 218 sends and receives electrical, electromagnetic, or optical signals that carry digital data streams representing various types of information.

The network link 220 typically provides data communication through one or more networks to other data devices. For example, the network link 220 provides a connection through the local network 222 to a host computer 224 or to a cloud data center or equipment operated by an Internet Service Provider (ISP) 226. The ISP 226 in turn provides data communication services through the world-wide packet data communication network now commonly referred to as the "Internet" 228. The local network 222 and Internet 228 both use electrical, electromagnetic or optical signals that carry digital data streams. The signals through the various networks and the signals on the network link 220 and through the communication interface 218, which carry the digital data to and from the computer system 200, are example forms of transmission media. In an embodiment, the network 220 contains the cloud or a part of the cloud.

The computer system 200 sends messages and receives data, including program code, through the network(s), the network link 220, and the communication interface 218. In an embodiment, the computer system 200 receives code for processing. The received code is executed by the processor 204 as it is received, and/or stored in storage device 210, or other non-volatile storage for later execution.

Autonomous Vehicle Architecture

Figure 3:
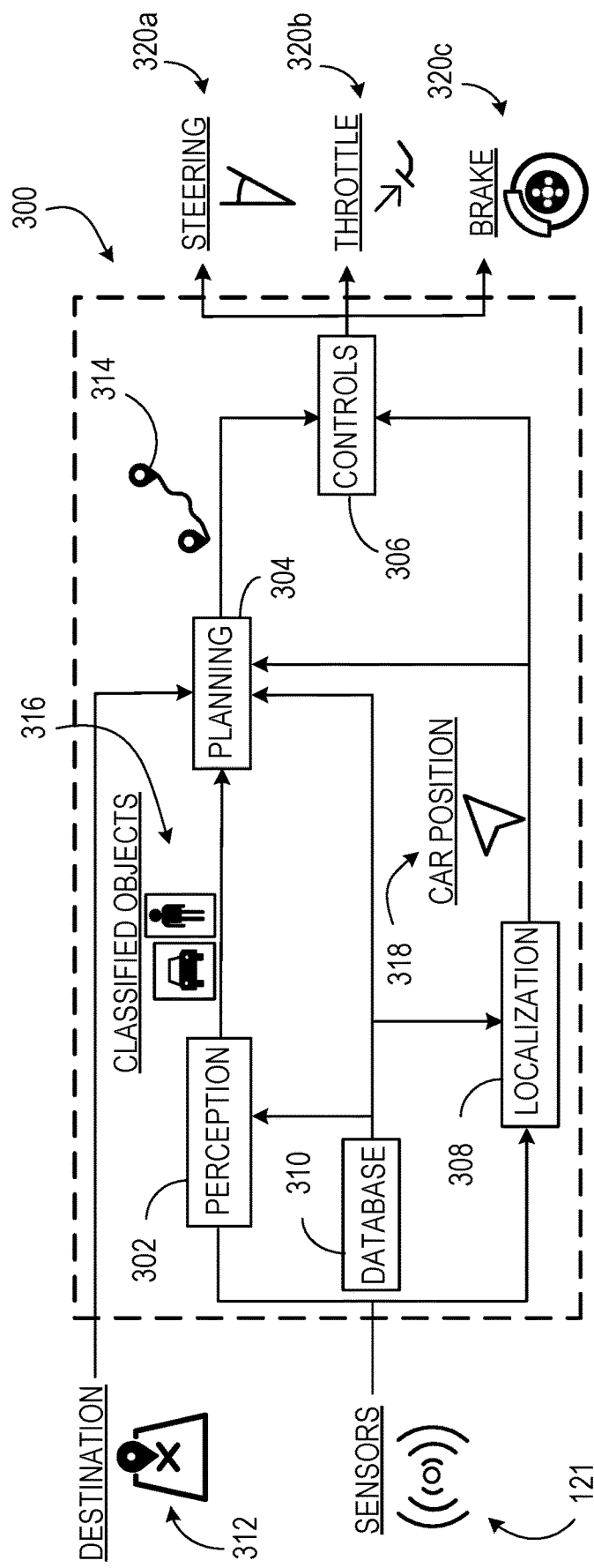
FIG. 3 shows an example architecture for an autonomous vehicle.

FIG. 3 shows an example architecture 300 for an autonomous vehicle (e.g., the vehicle 100 shown in FIG. 1). The architecture 300 includes a perception module 302 (sometimes referred to as a perception circuit), a planning module 304 (sometimes referred to as a planning circuit), a control module 306 (sometimes referred to as a control circuit), a localization module 308 (sometimes referred to as a localization circuit), and a database module 310 (sometimes referred to as a database circuit). Each module plays a role in the operation of the vehicle 100. Together, the modules 302, 304, 306, 308, and 310 can be part of the AV system 120 shown in FIG. 1. In some embodiments, any of the modules 302, 304, 306, 308, and 310 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 302, 304, 306, 308, and 310 is sometimes referred to as a processing circuit (e.g., computer hardware, computer software, or a combination of the two). A combination of any or all of the modules 302, 304, 306, 308, and 310 is also an example of a processing circuit.

In use, the planning module 304 receives data representing a destination 312 and determines data representing a trajectory 314 (sometimes referred to as a route) that can be traveled by the vehicle 100 to reach (e.g., arrive at) the destination 312. In order for the planning module 304 to determine the data representing the trajectory 314, the planning module 304 receives data from the perception module 302, the localization module 308, and the database module 310.

The perception module 302 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 316 is provided to the planning module 304.

The planning module 304 also receives data representing the AV position 318 from the localization module 308. The localization module 308 determines the AV position by using data from the sensors 121 and data from the database module 310 (e.g., a geographic data) to calculate a position. For example, the localization module 308 uses data from a GNSS (Global Navigation Satellite System) sensor and geographic data to calculate a longitude and latitude of the AV. In an embodiment, data used by the localization module 308 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 306 receives the data representing the trajectory 314 and the data representing the AV position 318 and operates the control functions 320a-c (e.g., steering, throttling, braking, ignition) of the AV in a manner that will cause the vehicle 100 to travel the trajectory 314 to the destination 312. For example, if the trajectory 314 includes a left turn, the control module 306 will operate the control functions 320a-c in a manner such that the steering angle of the steering function will cause the vehicle 100 to turn left and the throttling and braking will cause the vehicle 100 to pause and wait for passing pedestrians or vehicles before the turn is made.

Autonomous Vehicle Inputs

Figure 4:
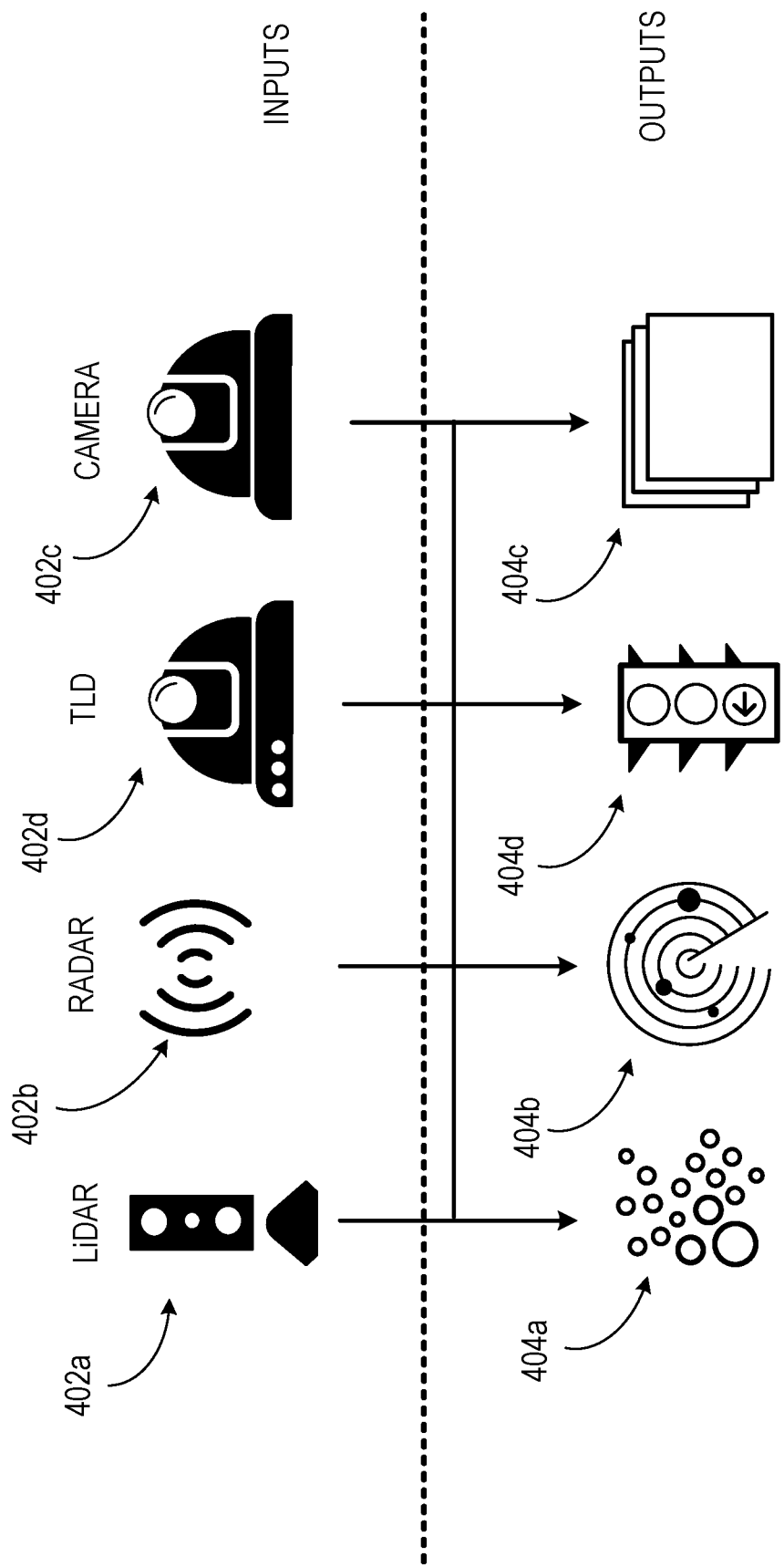
FIG. 4 shows an example of inputs and outputs that can be used by a perception module.

FIG. 4 shows an example of inputs 402a-d (e.g., sensors 121 shown in FIG. 1) and outputs 404a-d (e.g., sensor data) that is used by the perception module 302 (FIG. 3). One input 402a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 404a. For example, LiDAR data is collections of 3D or 2D points (also known as a point clouds) that are used to construct a representation of the environment 190.

Another input 402b is a RADAR system. RADAR is a technology that uses radio waves to obtain data about nearby physical objects. RADARs can obtain data about objects not within the line of sight of a LiDAR system. A RADAR system produces RADAR data as output 404b. For example, RADAR data are one or more radio frequency electromagnetic signals that are used to construct a representation of the environment 190.

Another input 402c is a camera system. A camera system uses one or more cameras (e.g., digital cameras using a light sensor such as a charge-coupled device [CCD]) to obtain information about nearby physical objects. A camera system produces camera data as output 404c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 402d is a traffic light detection (TLD) system. A TLD system uses one or more cameras to obtain information about traffic lights, street signs, and other physical objects that provide visual navigation information. A TLD system produces TLD data as output 404d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 404a-d are combined using a sensor fusion technique. Thus, either the individual outputs 404a-d are provided to other systems of the vehicle 100 (e.g., provided to a planning module 304 as shown in FIG. 3), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 5 shows an example of a LiDAR system 502 (e.g., the input 402a shown in FIG. 4). The LiDAR system 502 emits light 504a-c from a light emitter 506 (e.g., a laser transmitter). Light emitted by a LiDAR system is typically not in the visible spectrum; for example, infrared light is often used. Some of the light 504b emitted encounters a physical object 508 (e.g., a vehicle) and reflects back to the LiDAR system 502. (Light emitted from a LiDAR system typically does not penetrate physical objects, e.g., physical objects in solid form.) The LiDAR system 502 also has one or more light detectors 510, which detect the reflected light. In an embodiment, one or more data processing systems associated with the LiDAR system generates an image 512 representing the field of view 514 of the LiDAR system. The image 512 includes information that represents the boundaries 516 of a physical object 508. In this way, the image 512 is used to determine the boundaries 516 of one or more physical objects near an AV.

Figure 6:
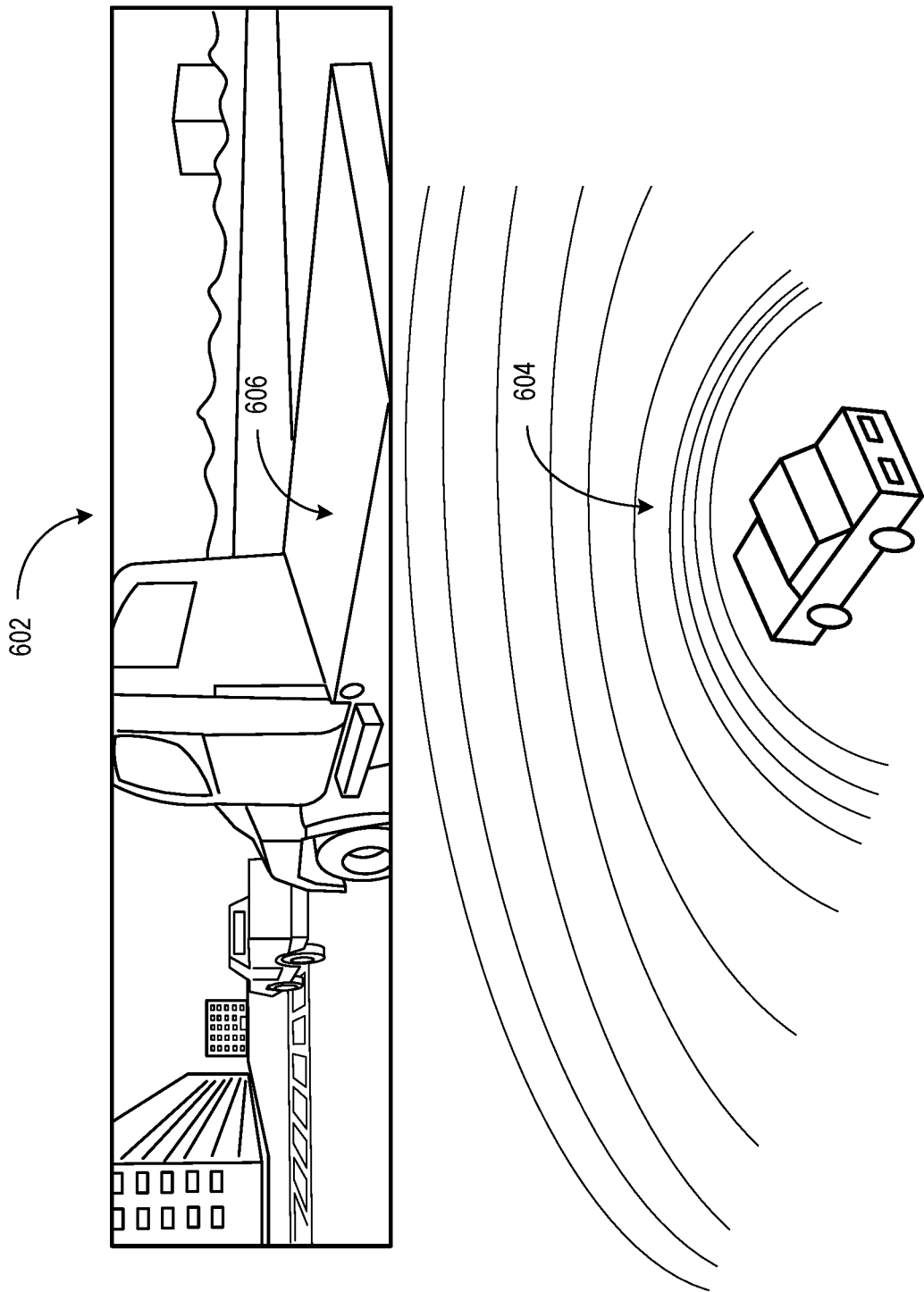
FIG. 6 shows the LiDAR system in operation.

FIG. 6 shows the LiDAR system 502 in operation. In the scenario shown in this figure, the vehicle 100 receives both camera system output 404c in the form of an image 602 and LiDAR system output 404a in the form of LiDAR data points 604. In use, the data processing systems of the vehicle 100 compares the image 602 to the data points 604. In particular, a physical object 606 identified in the image 602 is also identified among the data points 604. In this way, the vehicle 100 perceives the boundaries of the physical object based on the contour and density of the data points 604.

Figure 7:
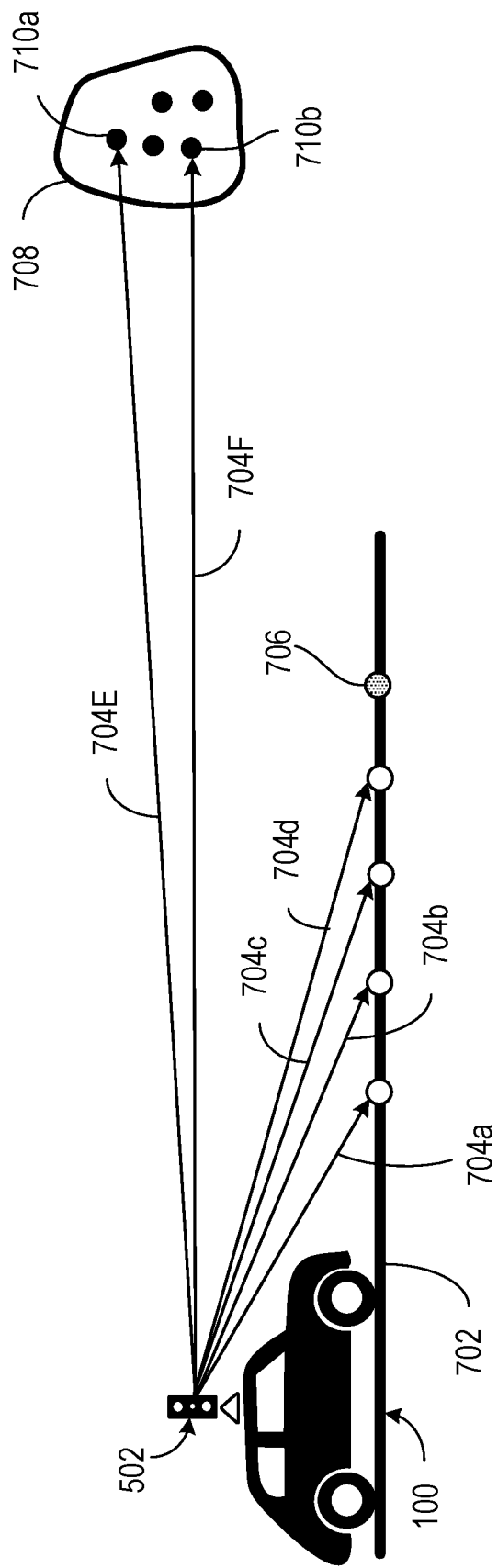
FIG. 7 shows the operation of the LiDAR system in additional detail.

FIG. 7 shows the operation of the LiDAR system 502 in additional detail. As described above, the vehicle 100 detects the boundary of a physical object based on characteristics of the data points detected by the LiDAR system 502. As shown in FIG. 7, a flat object, such as the ground 702, will reflect light 704a-d emitted from a LiDAR system 502 in a consistent manner. Put another way, because the LiDAR system 502 emits light using consistent spacing, the ground 702 will reflect light back to the LiDAR system 502 with the same consistent spacing. As the vehicle 100 travels over the ground 702, the LiDAR system 502 will continue to detect light reflected by the next valid ground point 706 if nothing is obstructing the road. However, if an object 708 obstructs the road, light 704e-f emitted by the LiDAR system 502 will be reflected from points 710a-b in a manner inconsistent with the expected consistent manner. From this information, the vehicle 100 can determine that the object 708 is present.

Scan Line Overview

As previously noted, for example with respect to FIGS. 6 and 7, LiDAR is used by a vehicle such as an autonomous vehicle to gather data related to the surroundings of said vehicle. In an embodiment, a LiDAR scan includes multiple scan lines (e.g., 20 scan lines, 40 scan lines, etc.). Each line corresponds to a planar representation of the environment in which the LiDAR system (e.g., LiDAR system 402a of FIG. 4) is located.

Figure 8:
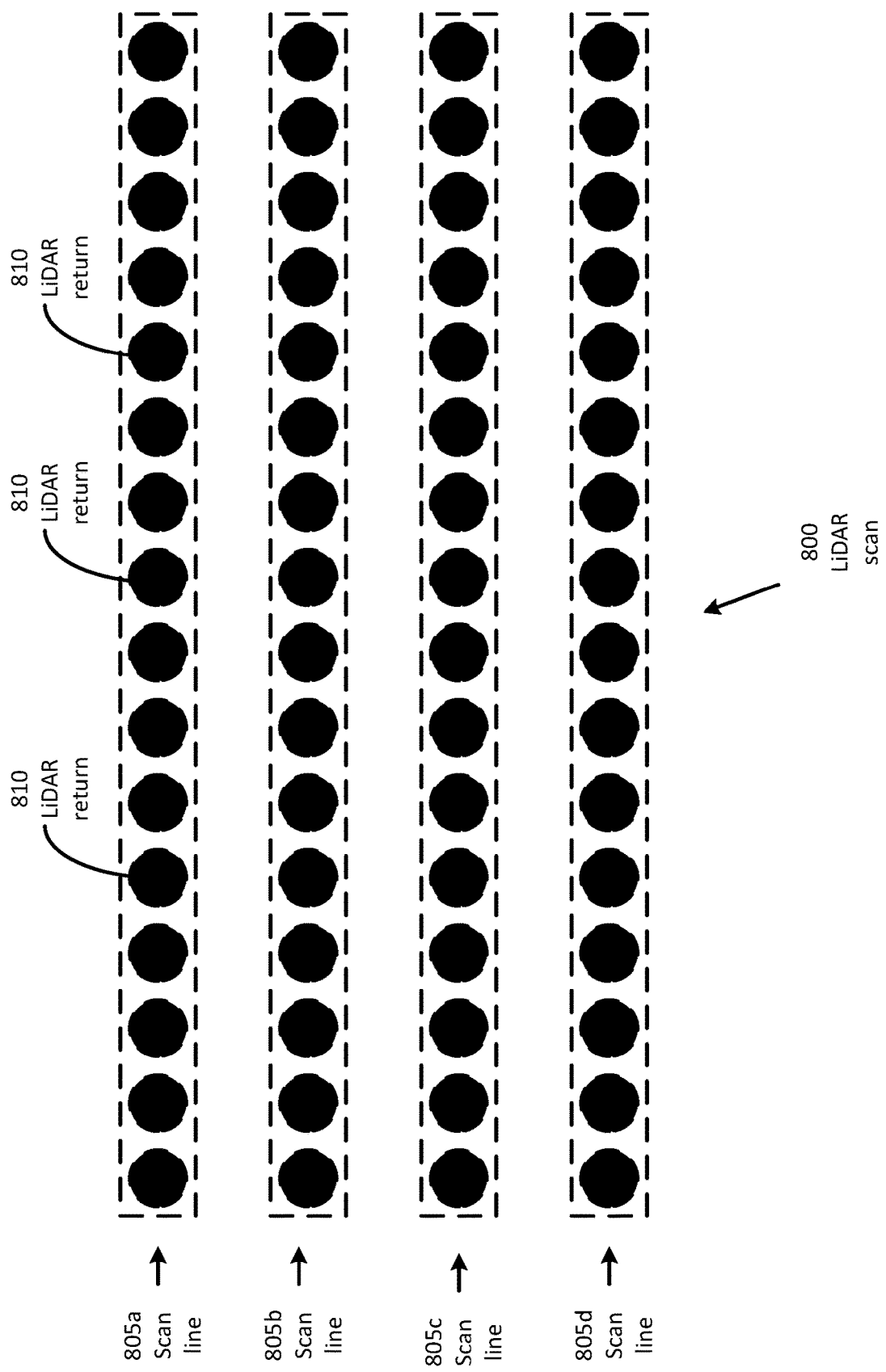
FIG. 8 depicts an example LiDAR scan with multiple scan lines, in accordance with an embodiment.

FIG. 8 depicts an example LiDAR scan 800 with multiple scan lines 805a, 805b, 805c, 805d (collectively, scan lines 805), in accordance with various embodiments. As previously noted, although only four scan lines 805 are depicted in the LiDAR scan 800, in another embodiment the LiDAR scan 800 can include more or fewer scan lines. For example, the LiDAR scan 800 can include between 20 and 40 scan lines in one embodiment, while in another embodiment the LiDAR scan 800 includes more or fewer scan lines dependent on factors such as processing power of the LiDAR system, the speed with which the scan is being performed, an acceptable quality of the scan, or some other factor. Additionally, although the scan lines 805 are depicted as being generally lateral, in another embodiment the scan lines 805 are rotated such that they are vertical, or at some angle between lateral and vertical. Additionally, the scan lines 805 are depicted as being separated by a vertical distance (with respect to the orientation of FIG. 8), however in real-world implementations the distance between the scan lines 805 may be more or less than depicted. Generally, FIG. 8 should be interpreted as a high-level example for the purpose of illustrating and discussing concepts herein, rather than being considered as a limiting example of real-world implementations.

Respective ones of the scan lines 805 include a plurality of LiDAR data points 810, which are similar to, for example, data points 604. For example, in the embodiment depicted in FIG. 8, each scan line 805 is shown as including sixteen LiDAR data points 810. However, it will be understood that another embodiment will include more or fewer LiDAR data points than depicted.

Respective ones of the LiDAR data points 810 relate to data that is provided to the LiDAR system. Specifically, respective LiDAR data points 810 provide TOF data to the LiDAR system. The TOF data relates to the length between the time that an optical signal left an emitter of the LiDAR system and the time that the reflected optical signal was received by a receiver of the LiDAR system. Through the use of this TOF data for respective LiDAR data points 810 of scan lines 805 of a LiDAR scan 800, the LiDAR system is able to construct, or facilitate construction of, a three-dimensional (3D) image of objects around the LiDAR system (for example, as explained above with respect to FIGS. 4 and 5).

Smoothness Coefficient Examples

As previously noted, the results of a LiDAR scan (e.g., LiDAR scan 800) are used by an autonomous vehicle for a localization process. That is, in an embodiment, the results of the LiDAR scan 800 are compared to pre-identified information of geographic locations. Based on this comparison, the autonomous vehicle is able to identify where the autonomous vehicle is currently located.

However, in some situations the localization procedure is complicated by inconsistent or transient objects or structures. For example, the shape of certain vegetation such as shrubs or trees changes with the changing of seasons, pruning, etc. Other transient objects such as people, bicycles, etc. will likewise create inconsistent results within the LiDAR scan such that a scan of a location at one time is different than a scan of the same location at a different time if such objects move or change shape.

By contrast, more consistent or permanent (e.g., non-transient) structures will provide more consistent results during the localization procedure. Such objects include artificial structures such as buildings, road barriers, walls, etc. Because these objects are artificial, these objects often have a relatively flat or smooth profile in comparison to the profile of objects such as trees, where the leaves or branches may generate significant variance within the LiDAR scan. Therefore, to increase the consistency of the results of the LiDAR scan, embodiments herein remove data points from the LiDAR scan that are identified as belonging to a transient structure such as vegetation, the presence of a person or bicycle, etc.

One way by which a data points may be removed from the LiDAR scan is by analyzing a data point in context with other data points around it. Specifically, in an embodiment, a data point is analyzed and a smoothness coefficient c is calculated. The smoothness coefficient c is then compared to a threshold value. If the smoothness coefficient c is greater than (or, optionally, greater than or equal to) the threshold value, then the LiDAR system (or a processor coupled thereto) identifies that the data point belongs to a region with a relatively high degree of variability, and therefore that the data point is associated with a transient object. In some embodiments, the LiDAR system can then determine that the data point should be removed from the scan line. If the smoothness coefficient c is less than (or, optionally, less than or equal to) the threshold value, then the LiDAR system (or a processor coupled thereto) identifies that the data point belongs to a region with a relatively low degree of variability and therefore should remain in the scan line (or be included in an output "smoothed" scan line).

Equation 1 presents an example equation by which a smoothness coefficient c is calculated for point $X_{(k,i)}^L$.

$$c = \frac{1}{|S| \cdot \|X_{(k,i)}^L\|} \|\Sigma_{j \in S, j \neq i}(X_{(k,i)}^L - X_{(k,j)}^L)\| \qquad \text{(Equation 1)}$$

Specifically, $X^L$ refers to a data point in a LiDAR scan such as LiDAR scan 800. k is an identifier of a given scan line. In Equation 1, the data point in question, $X_{(k,i)}^L$, is compared to a number S of data points. i and j may refer to specific positions within the scan line. Specifically, the data related to data point $X_{(k,i)}^L$ is compared to data related to each of the other data points in S. Based on this comparison, the smoothness coefficient c is calculated. Specifically, vectors between the data point in question, $X_{(k,i)}^L$, and each other point in S are calculated or identified. The vectors are then summed together to produce the smoothness coefficient c.

It will be noted that in one embodiment each of the vectors between the data point in question and each of the other data points is calculated to produce the coefficient c. However, in another embodiment one or more of the vectors may have been pre-calculated and is stored such that it may be identified rather than re-calculated. For example, in one embodiment a coefficient c will have been calculated for one of the data points in S based on a vector between that data point and the data point currently in question, $X_{(k,i)}^L$. As such, recalculation of the vector may not be necessary and, instead, the vector may be identified as previously calculated.

Figure 9:
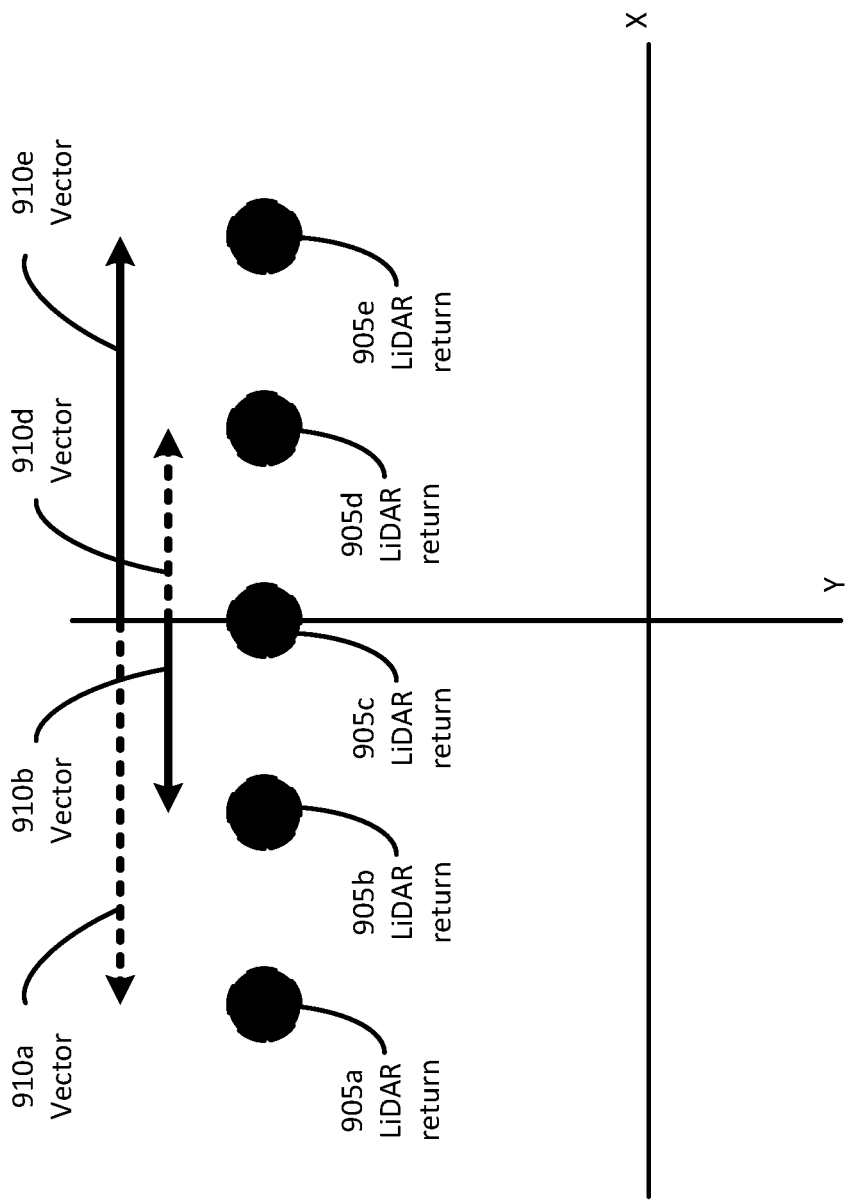
FIG. 9 depicts a graphical example of the algorithm by which a smoothness coefficient related to a data point of a LiDAR scan is computed, in accordance with an embodiment.
Figure 10:
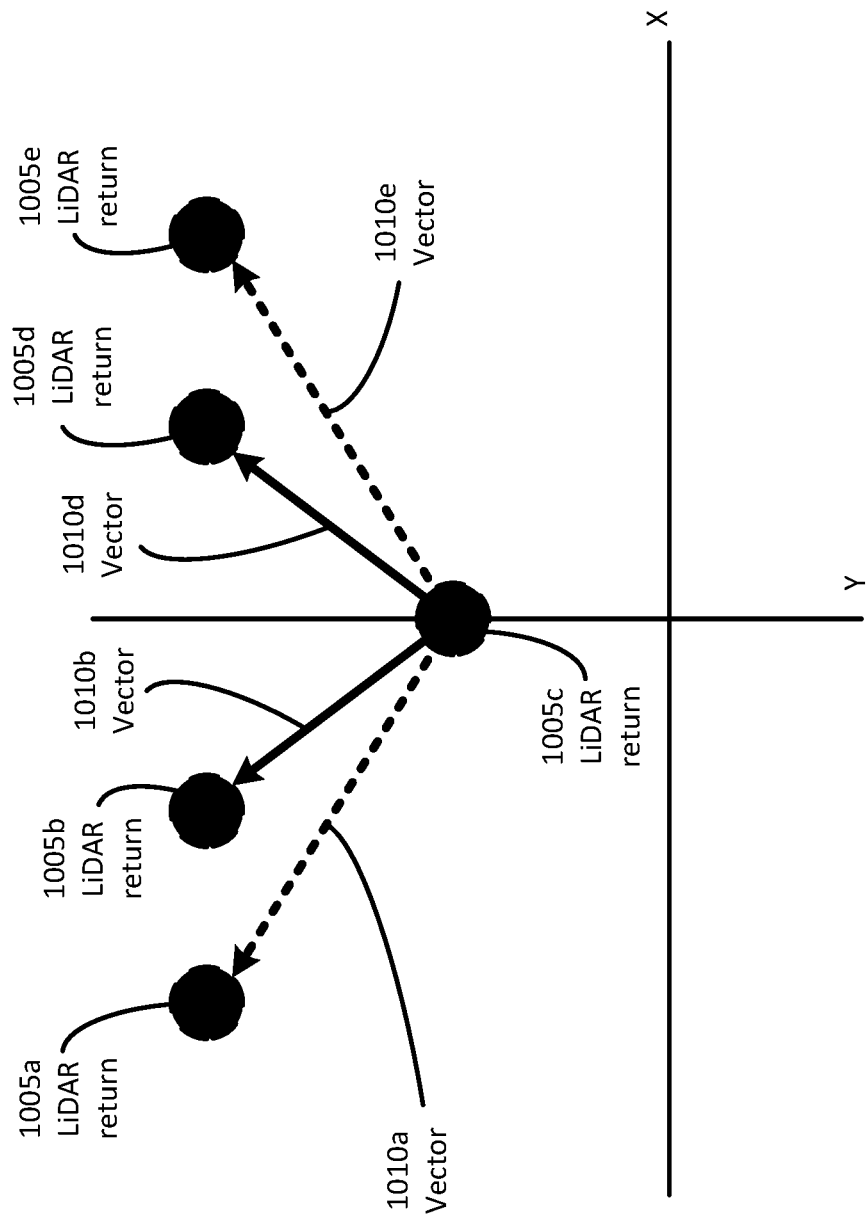
FIG. 10 depicts an alternative graphical example of the algorithm by which a smoothness coefficient related to a data point of a LiDAR scan is computed, in accordance with an embodiment.

FIG. 9 depicts a graphical example of the algorithm by which a smoothness coefficient related to a data point of a LiDAR scan is computed, in accordance with an embodiment. FIG. 10 depicts an alternative graphical example of the algorithm by which a smoothness coefficient related to a data point of a LiDAR scan is computed, in accordance with an embodiment.

Specifically, in FIGS. 9 and 10, an X-axis X and a Y-axis Y are depicted. Generally, it may be assumed that the LiDAR system is located at the crosspoint of axes X and Y. A number of LiDAR data points are depicted in FIGS. 9 and 10, which are similar to LiDAR data points 810 of FIG. 8.

Specifically, FIG. 9 depicts LiDAR data points 905a, 905b, 905c, 905d, and 905e (collectively, LiDAR data points 905). FIG. 10 depicts LiDAR data points 1005a, 1005b, 1005c, 1005d, and 1005e (collectively, LiDAR data points 1005). In the depiction of FIGS. 9 and 10, the LiDAR data points 905 and 1005 are based on the TOF data related to each data point, with FIGS. 9 and 10 representing a top-down view of the TOF data with respect to where the LiDAR system can be located.

Turning specifically to FIG. 9, LiDAR data point 905c is the data point under current analysis, and corresponds to $X_{(k,i)}^L$ of Equation 1. In this example, S is equal to 5.

In accordance with Equation 1, vectors 910a, 910b, 910d, and 910e (collectively, vectors 910) are calculated between data point 905c and each of the other data points 905a, 905b, 905d, and 905e. The vectors 910 are then summed together. It will be seen in FIG. 9 that the sum of vectors 910 are approximately zero. Specifically, the values associated with certain vectors (e.g., vectors 910a and 910e) can cancel one another out. Likewise, vectors 910b and 910d can cancel one another out. As such, the coefficient c is approximately 0, indicating that the data point 905c is "smooth" and therefore should remain in the scan line or included in an updated scan line. It will be noted that this indication that data point 905c is "smooth" corresponds to the visual depiction of the group of data points 905 in FIG. 9.

By contrast, FIG. 10 depicts a group S of LiDAR data points 1005 wherein LiDAR data point 1005c is considered to have a higher coefficient c than the coefficient c of data point 905c. Similarly to FIG. 9, a number of vectors 1010a, 1010b, 1010d, and 1010e (collectively, vectors 1010) are calculated between data point 1005c and the other data points of FIG. 10. The vectors 1010 are then summed to calculate coefficient c as discussed above with respect to Equation 1.

The horizontal components of each of the vectors 1010a (e.g., the components along the X-axis) cancel one another out in a manner similar to that described above with respect to FIG. 9. Specifically, the horizontal component of vector 1010a cancels the horizontal component of vector 1010e. Similarly, the horizontal component of vector 1010b cancels the horizontal component of vector 1010d.

However, each of the vectors 1010 further have a vertical component (e.g., a component along the Y-axis) that is not canceled. As such, the overall sum of the vectors 1010 is greater than 0, resulting in a non-zero c.

This description of how a smoothness coefficient c is calculated may be considered to be a simplified example of one embodiment, and other embodiments may vary. For example, the specific Equation 1 is intended as one example, and other variations may be based on a different equation that is used for calculating a smoothness coefficient such as c. As one example variation, the group of data points S may include data points from multiple scan lines, rather than the single scan line described with respect to Equation 1 or FIG. 9 or 10.

Use of the Smoothness Coefficient

Figure 11:
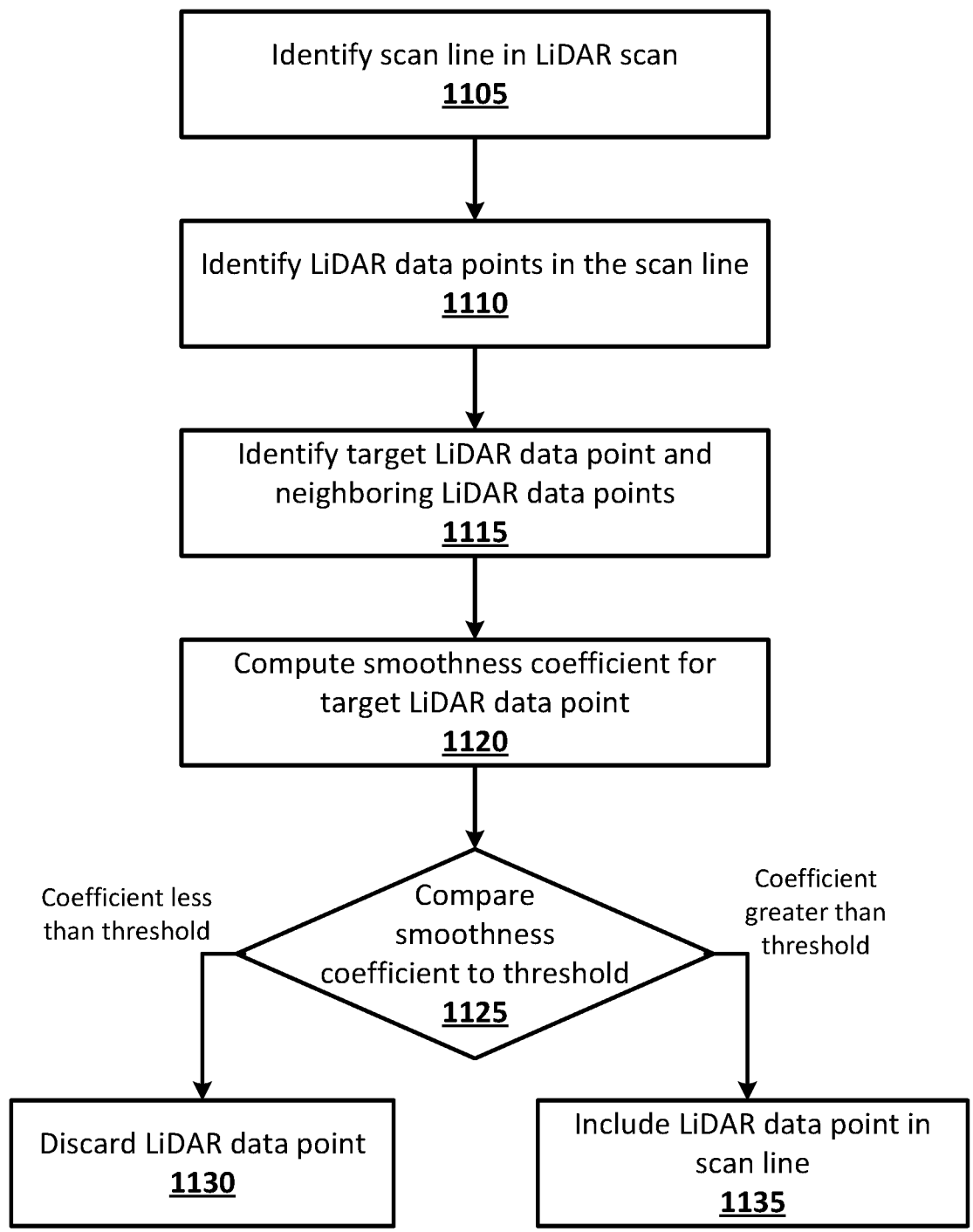
FIG. 11 depicts an example technique by which a LiDAR scan line is updated, in accordance with an embodiment.

FIG. 11 depicts an example technique by which a LiDAR scan line is updated, in accordance with various embodiments. Generally, the technique relates to the use of the smoothness coefficient c as described above. The technique may be performed by a LiDAR system such as LiDAR system 402a (FIG. 4), a processor such as processor 204 (FIG. 2), a control module such as control module 306 (FIG. 3), a localization module such as localization module 308 (FIG. 3), some combination thereof, at least one additional element of an autonomous vehicle.

Initially, a scan line in a LiDAR scan is identified at 1105. The scan line is similar to, for example, one of LiDAR scan lines 805. The technique further includes identifying, at 1110, LiDAR data points based on the scan line. The LiDAR data points are similar to, for example, LiDAR data points 905, or 1005 and are based on LiDAR data points 810 in scan line(s) 805.

The technique further includes identifying, at 1115, a target LiDAR data point and neighboring LiDAR data points. The target LiDAR data point is, for example, LiDAR data point 905c or 1005c that corresponds to $X_{(k,i)}^L$. The neighboring LiDAR data points are, for example, LiDAR data points 905a/905b/905d/905e/1005a/1005b/1005d/1005e that correspond to the other data points in S.

The technique further includes computing, at 1120, a smoothness coefficient for a target LiDAR data point. The smoothness coefficient, for example, the coefficient c that is calculated in accordance with Equation 1 as described above. In another embodiment, the smoothness coefficient is additionally or alternatively a different coefficient that is calculated in accordance with a different equation or equation, or in accordance with at least one other variables.

The technique further includes comparing, at 1125, the smoothness coefficient (e.g., c) with a threshold. In one embodiment, the above-noted comparison is performed based on identification of whether the smoothness coefficient is greater than (or greater than or equal to) the threshold. In another embodiment, the comparison is based on identification of whether the smoothness coefficient is less than (or less than or equal to) the threshold. In another embodiment, the comparison is a different type of comparison.

In one embodiment, the threshold is a pre-identified threshold. That is, the threshold is pre-identified based on previous testing or some other factor. In another embodiment, the threshold is at least partially dynamic. For example, the threshold is based on analysis of other data points in a given LiDAR scan, other data points in a scan line, previous calculated coefficients, etc.

If the coefficient is identified at 1125 to be less than (or, in an embodiment, less than or equal to) the threshold, then the specific LiDAR data point (e.g., $X_{(k,i)}^L$) is discarded. As used herein, discarding a data point refers to removing the specific LiDAR data point from a scan line or LiDAR scan that is used for the purpose of localization. By contrast, if the coefficient is identified to be greater than (or greater than or equal to) the threshold, then the LiDAR data point is included in a scan line that is processed by a localization module (e.g., localization module 408). Such a scan line is referred to as an "updated" scan line. In an embodiment, the updated scan line is the existing scan line with the discarded data points removed. In another embodiment, the updated scan line is a new scan line that is being generated based on the included data points.

More specifically, in an embodiment, if the coefficient is less than (or less than or equal to) the threshold, then the LiDAR data point may be discarded from the scan line, while in another embodiment the LiDAR data point may be marked for removal from the scan line in, for example, a batch operation. In another embodiment, if the coefficient is greater than (or greater than or equal to) the threshold, then the LiDAR data point may not be removed from the scan line and, instead, may remain in the scan line. In another embodiment, the LiDAR data point may be included in a new iteration of the scan line which is based on LiDAR data points that were marked as having an acceptable smoothness coefficient (e.g., a coefficient that is greater than, or greater than or equal to, the threshold).

Figure 12:
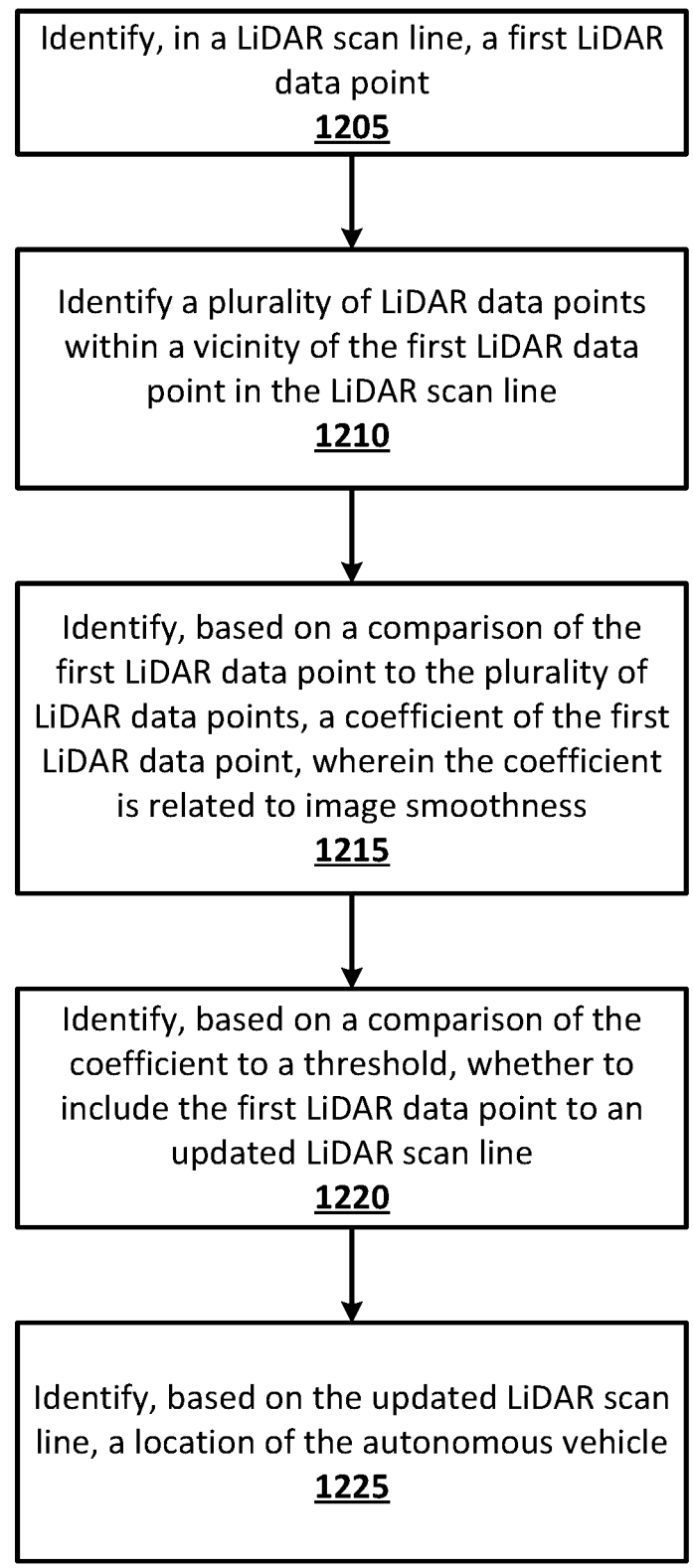
FIG. 12 depicts an alternative example technique by which a LiDAR scan line is updated, in accordance with an embodiment.

FIG. 12 depicts an alternative example technique by which a LiDAR scan line is updated, in accordance with an embodiment. Generally FIG. 12 is considered to be complementary to FIG. 11, and includes similar elements. Similarly to FIG. 11, the technique may be performed by a LiDAR system such as LiDAR system 402a (FIG. 4), a processor such as processor 204 (FIG. 2), a control module such as control module 306 (FIG. 3), a localization module such as localization module 308 (FIG. 3), some combination thereof, or at least one additional elements of an autonomous vehicle.

The technique includes identifying, at 1205, in a LiDAR scan line, a first LiDAR data point. The LiDAR scan line is similar to, for example, one of LiDAR scan lines 805. The LiDAR data point is similar to, for example, LiDAR data points 810, 905, or 1005. More specifically, the first LiDAR data point is similar to one of LiDAR data points 905c or 1005c.

The technique further includes identifying, at 1210, a plurality of LiDAR data points within a vicinity of the first LiDAR data point in the LiDAR scan line 1210. The plurality of LiDAR data points are, for example, the other data points in S and include data points 905a/905b/905d/905e/1005a/1005b/1005d/1005e. As previously noted, in an embodiment all of the plurality of LiDAR data points are in a same scan line as the first LiDAR data point, while in another embodiment at least one of the plurality of LiDAR data points is in a different scan line than the first LiDAR data point.

The technique further includes identifying, at 1215, based on a comparison of the first LiDAR data point to the plurality of LiDAR data points, a coefficient of the first LiDAR data point, wherein the coefficient is related to image smoothness. The comparison is, for example, the comparison described above with respect to Equation 1, and the coefficient is c. However, as previously noted, in another embodiment the comparison is some other type of comparison based on a different equation or at least one additional or alternative factor.

The technique further includes identifying, at 1220 based on a comparison of the coefficient to a threshold, whether to include the LiDAR return point in an updated LiDAR scan line. The threshold is, for example, the threshold described above with respect to element 1125. Specifically, the threshold is a pre-determined threshold or a dynamic threshold as described above. Additionally, as noted, the comparison of the threshold is to identify whether the coefficient is greater than (or greater than or equal to) the threshold, or less than (or less than or equal to) the threshold.

If the coefficient is identified as being greater than (or greater than or equal to) the threshold, the first data point is discarded from an updated scan line. By contrast, if the coefficient is identified as being less than (or less than or equal to) the threshold, then the first data point is included in an updated scan line. As previously noted, in one embodiment inclusion in an updated scan line includes not removing the data point from an existing scan line. In another embodiment, inclusion in an updated scan line is based on including the data point in a new scan line that is being created.

The technique then includes identifying, at 1225, based on the updated LiDAR scan line, a location of the AV. Specifically, as described above with respect to localization module 308, the localization module 308 determines the AV position by using data from the sensors 121 (e.g., the updated scan line) and data from the database module 310 (e.g., a geographic data) to calculate a position. As described above, by removing data points that are related to transient elements such as trees, people, etc., then the localization module 308 will identify the position of the AV based on non-transient elements such as buildings, roadways, etc. As a result, the consistency of the localization module 308 will be increased, thereby increasing the overall efficiency of navigation of the AV.

It will be understood that the techniques described with respect to FIGS. 11 and 12 are intended as high-level example techniques, and another embodiment will include variations from those examples. For example, various embodiments have more or fewer elements than depicted in the example techniques, or elements in a different arrangement or order than depicted. Other variations will be present in another embodiment.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. One or more non-transitory computer-readable media comprising instructions that, upon execution of the instructions by one or more processors of a vehicle, cause the vehicle to:
    identify, in a light detection and ranging (LiDAR) scan line, a first LiDAR data point;
    identify a plurality of LiDAR data points within a vicinity of the first LiDAR data point in the LiDAR scan line;
    identify, based on a comparison of the first LiDAR data point to at least one LiDAR data point of the plurality of LiDAR data points, a coefficient of the first LiDAR data point, wherein the coefficient is related to image smoothness;
    identify, based on a comparison of the coefficient to a threshold, whether to include the first LiDAR data point in an updated LiDAR scan line; and
    identify, based on the updated LiDAR scan line, a location of the vehicle.

2. The one or more non-transitory computer-readable media of claim 1, wherein the instructions cause the vehicle to include the LiDAR data point to the updated LiDAR scan line if the coefficient is at or below the threshold.

3. The one or more non-transitory computer-readable media of claim 1, wherein the instructions cause the vehicle to not add the first LiDAR data point to the updated LiDAR scan line if the coefficient is at or above the threshold.

4. The one or more non-transitory computer-readable media of claim 1, wherein the threshold is a pre-determined threshold associated with presence of a transient element.

5. The one or more non-transitory computer-readable media of claim 1, wherein the identification of the coefficient is based on a comparison of vectors between the first LiDAR data point and respective LiDAR data points of the plurality of LiDAR data points.

6. The one or more non-transitory computer-readable media of claim 5, wherein the instructions further cause the vehicle to:
    generate a vector between the first LiDAR data point and a second LiDAR data point of the plurality of LiDAR data points; and
    identify a previously determined vector between the first LiDAR data point and a third LiDAR data point of the plurality of LiDAR data points.

7. The one or more non-transitory computer-readable media of claim 6, wherein at least one of the second or third LiDAR data points is adjacent to the first LiDAR data point in the LiDAR scan line.

8. A method comprising:
    identifying, by at least one processor, a first light detection and ranging (LiDAR) data point in a LiDAR scan line, a second LiDAR data point that is adjacent to the first LiDAR data point in the LiDAR scan line, and a third LiDAR data point that is adjacent to the first LiDAR data point in the LiDAR scan line;
    identifying, by the at least one processor, a coefficient of the first LiDAR data point based on a comparison of the first LiDAR data point to the second and third LiDAR data points, wherein the coefficient is related to image smoothness;
    identifying, by the at least one processor, whether to include the first LiDAR data point in an updated LiDAR scan line based on a comparison of the coefficient to a threshold; and
    identifying, based on the updated LiDAR scan line, a location of a vehicle.

9. The method of claim 8, further comprising including, by the at least one processor, the LiDAR data point to the updated LiDAR scan line if the coefficient is at or below the threshold.

10. The method of claim 8, further comprising discarding, by the at least one processor, the first LiDAR data point from the updated LiDAR scan line if the coefficient is at or above the threshold.

11. The method of claim 8, wherein the threshold is a pre-determined threshold associated with presence of a transient element.

12. The method of claim 8, wherein identifying the coefficient includes:
    comparing, by the at least one processor, a vector between the first and second LiDAR data points to identify a first comparison value;
    comparing, by the at least one processor, a vector between the first and third LiDAR data points to identify a second comparison value; and
    calculating, by the at least one processor, the coefficient based on the first and second comparison values.

13. The method of claim 12, wherein comparing the vector between the first and second LiDAR data points includes calculating, by the at least one processor, the vector between the first and second LiDAR data points.

14. The method of claim 12, wherein comparing the vector between the first and second LiDAR data points includes identifying, by the at least one processor, a pre-identified vector between the first and second LiDAR data points.

15. A vehicle comprising:

a light detection and ranging (LiDAR) system to generate one or more LiDAR scan lines that include a plurality of LiDAR data points; and at least one processor coupled with the LiDAR system, the at least one processor to:

identify, in the plurality of LiDAR data points, a first LiDAR data point, a second LiDAR data point that is adjacent to the first LiDAR data point in the scan line, and a third LiDAR data point that is adjacent to the first LiDAR data point in the scan line;

identify, based on a comparison of the first LiDAR data point to the second and third LiDAR data points, a coefficient of the first LiDAR data point, wherein the coefficient is related to image smoothness; and identify, based on a comparison of the coefficient to a threshold, whether to include the first LiDAR data point in an updated LiDAR scan line.

16. The vehicle of claim 15, wherein the at least one processor is to add the LiDAR data point to the updated LiDAR scan line if the coefficient is at or below the threshold.

17. The vehicle of claim 15, wherein the at least one processor is to discard the first LiDAR data point from the updated LiDAR scan line if the coefficient is at or above the threshold.

18. The vehicle of claim 15, wherein identification of the coefficient includes:

identification of a first comparison value based on a comparison of a vector between the first and second LiDAR data points;

identification of a second comparison value based on a comparison a vector between the first and third LiDAR data points; and calculation of the coefficient based on the first and second comparison values.

19. The vehicle of claim 18, wherein the at least one processor is to calculate the vector between the first and second LiDAR data points.

20. The vehicle of claim 18, wherein the at least one processor is to identify a pre-calculated vector between the first and second LiDAR data points.

* * * * *